United States Patent
Zeng et al.

(10) Patent No.: US 10,033,576 B2
(45) Date of Patent: Jul. 24, 2018

(54) METHOD, SYSTEM AND DEVICE FOR TRANSMITTING AND RECEIVING DATA

(71) Applicant: China Academy of Telecommunications Technology, Beijing (CN)

(72) Inventors: Erlin Zeng, Beijing (CN); Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 84 days.

(21) Appl. No.: 15/023,345

(22) PCT Filed: Sep. 22, 2014

(86) PCT No.: PCT/CN2014/087059
§ 371 (c)(1),
(2) Date: Mar. 18, 2016

(87) PCT Pub. No.: WO2015/039626
PCT Pub. Date: Mar. 26, 2015

(65) Prior Publication Data
US 2016/0269226 A1  Sep. 15, 2016

(30) Foreign Application Priority Data
Sep. 23, 2013 (CN) .......................... 2013 1 0436118

(51) Int. Cl.
*H04W 4/00* (2018.01)
*H04L 12/24* (2006.01)
(Continued)

(52) U.S. Cl.
CPC ............ *H04L 41/08* (2013.01); *H04L 5/0094* (2013.01); *H04L 5/14* (2013.01); *H04W 72/02* (2013.01);
(Continued)

(58) Field of Classification Search
CPC .............................. H04W 40/00; H04W 72/04
(Continued)

(56) References Cited

U.S. PATENT DOCUMENTS

2009/0249153 A1   10/2009   Zhang
2012/0230232 A1   9/2012   Ji et al.
(Continued)

FOREIGN PATENT DOCUMENTS

CN      102271032 A      12/2011
CN      102594436 A      7/2012
(Continued)

OTHER PUBLICATIONS

Chinese Office Action dated Jun. 27, 2017, for CN Application No. 201310436118.4, 13 pages.
(Continued)

*Primary Examiner* — Iqbal Zaidi
(74) *Attorney, Agent, or Firm* — Morgan Lewis & Bockius LLP

(57) ABSTRACT

The present disclosure relates to the field of wireless communication technology, and provides a method, a system and a device for transmitting and receiving data, so as to improve a resource utilization rate of a new UE during the data reception in the case of dynamic uplink/downlink subframe switching. The method for receiving data includes steps of: determining, by a UE, first configuration information for a dynamic subframe and second configuration information in system information; and receiving, by the UE, data in accordance with the first configuration information and the second configuration information. According to the present disclosure, it is able to improve a resource utilization rate during the data reception.

16 Claims, 3 Drawing Sheets

(51) Int. Cl.
*H04L 5/14* (2006.01)
*H04W 72/02* (2009.01)
*H04L 5/00* (2006.01)
H04W 72/04 (2009.01)
H04W 68/00 (2009.01)
H04W 88/02 (2009.01)

(52) U.S. Cl.
CPC ... *H04W 72/0406* (2013.01); *H04W 72/0446* (2013.01); *H04W 68/005* (2013.01); *H04W 72/042* (2013.01); *H04W 88/02* (2013.01)

(58) Field of Classification Search
USPC .................................................. 370/328–339
See application file for complete search history.

(56) References Cited

U.S. PATENT DOCUMENTS

| | | | |
|---|---|---|---|
| 2012/0230273 A1* | 9/2012 | He | H04L 1/1887 370/329 |
| 2012/0287799 A1 | 11/2012 | Chen et al. | |
| 2012/0300681 A1 | 11/2012 | Ji et al. | |
| 2013/0044652 A1 | 2/2013 | Wang et al. | |
| 2013/0194980 A1 | 8/2013 | Yin et al. | |
| 2014/0086119 A1 | 3/2014 | Yang et al. | |
| 2014/0177486 A1* | 6/2014 | Wang | H04L 5/0053 370/280 |
| 2014/0247801 A1 | 9/2014 | Oizumi et al. | |
| 2014/0293909 A1 | 10/2014 | Xu et al. | |

FOREIGN PATENT DOCUMENTS

| | | |
|---|---|---|
| CN | 102684855 A | 9/2012 |
| KR | 10-2010-0139062 A | 12/2010 |
| KR | 10-2012-0103200 A | 9/2012 |
| KR | 10-2012-0130405 A | 12/2012 |
| WO | WO 2013/002591 A2 | 1/2013 |
| WO | WO 2013/069218 A1 | 5/2013 |
| WO | WO 2013/112372 A1 | 8/2013 |

OTHER PUBLICATIONS

Extended European Search Report dated Aug. 16, 2017, for EP Application No. 14846406.8, 13 pages.

International Search Report and Written Opinion dated Dec. 24, 2014, for International Application No. PCT/CN2014/087059, 19 pages.

Japanese Notification of Reasons for Refusal for JP Application No. 2016-537119, 6 pages.

Korean Notification of Reason for Refusal dated Aug. 8, 2016, for KR Application No. 10-2016-7005319, 9 pages.

LG Electronics, "Other Design Aspects for TDD eIMTA," 3GPP TSG RAN WG1 Meeting #74, Barcelona, Spain, Aug. 19-23, 2013, 4 pages.

\* cited by examiner

METHOD, SYSTEM AND DEVICE FOR TRANSMITTING AND RECEIVING DATA

CROSS-REFERENCE TO RELATED APPLICATION

The present application is a U.S. National Phase of PCT Application No. PCT/CN2014/087059 filed on Sep. 22, 2014, which claims the priority of the Chinese patent application No. 201310436118.4 filed on Sep. 23, 2013, and entitled "Method, System and Device for Transmitting and Receiving Data", which is incorporated herein by reference in its entirety.

TECHNICAL FIELD

The present disclosure relates to the field of wireless communication technology, in particular to a method, a system and a device for transmitting and receiving data.

BACKGROUND

It is necessary for a $3^{rd}$ Generation Partnership Project (3GPP) system and its Long Term Evolution (LTE) system to support dynamic uplink/downlink subframe switching in a Time Division Duplexing (TDD) mode. Through this dynamic uplink/downlink subframe switching, d is able to meet the requirements on uplink/downlink data transmission in a network in a more accurate manner, thereby to improve a network transmission rate and reduce time delay.

In an existing LTE system, channel resources are divided in the TDD mode into a series of radio frames in a time domain, and each frame is further divided into several subframes (e.g., 10 subframes). In an existing TDD system, uplink/downlink subframe configuration in one radio frame is indicated in system information. As shown in FIG. 1, uplink/downlink subframe configuration #0 is indicated in initial system information, and prior to a certain radio frame K, the network determines, in accordance with the volume of uplink/downlink data to be transmitted, that it is required to switch configuration #0 to configuration #5 through "switching 1" so as to provide more downlink subframes. At a certain radio frame K+M, the network determines that it is required to switch configuration #5 to configuration #0 through "switching 2" so as to provide more uplink subframes.

In the existing system, it is required for a User Equipment (UE) to receive the data based on a hypothesis of a current subframe structure. For example, when a current subframe is a downlink subframe, it is hypothesized that 14 symbols may be used for the downlink reception, and when the current subframe is a special subframe, the number of the symbols for reception may be determined in accordance with special subframe configuration in high-layer signaling.

In the case of dynamic uplink/downlink subframe switching, when a certain subframe is indicated in the system information as a special subframe and this subframe is dynamically changed to a downlink subframe, a new UE may acquire the configuration of the dynamically-changed subframe. However, in order to not affect the data reception of a traditional UE, such public information as paging information and system information must be received on the basis of a special subframe format, resulting in a decrease in a resource utilization rate of the new UE during the data reception.

SUMMARY

An object of the present disclosure is to provide a method, a system and a device for transmitting and receiving data, so as to improve a resource utilization rate of a new UE during the data reception in the case of dynamic uplink/downlink subframe switching.

In one aspect, the present disclosure provides in some embodiments a method for receiving data, including steps of: determining, by a UE, first configuration information for a dynamic subframe and second configuration information in system information; and receiving, by the UE, data in accordance with the first configuration information and the second configuration information.

According to the method in the embodiments of the present disclosure, the UE receives the data in accordance with the first configuration information for the dynamic subframe and the second configuration information in the system information, so that the UE may receive the data within an identical subframe on the basis of different frame structures in the case of the known second configuration information. As a result, it is able to improve the resource utilization rate during the data reception.

Optionally, the step of receiving, by the UE, the data in accordance with the first configuration information and the second configuration information includes: for one subframe, when the one subframe is determined as a downlink subframe in accordance with the first configuration information and the one subframe is determined as the downlink subframe in accordance with the second configuration information, receiving, by the UE, the data using the one subframe as the downlink subframe; or, for one subframe, when the one subframe is determined as a special subframe in accordance with the first configuration information and the one subframe is determined as a downlink subframe in accordance with the second configuration information, receiving, by the UE, the data using the one subframe as the special subframe; or, for or e subframe, when the one subframe is determined as a special subframe in accordance with the first configuration information and the one subframe is determined as the special subframe in accordance with the second configuration information, receiving, by the UE, the data using the one subframe as the special subframe; or, for one subframe, when the one subframe is determined as a downlink subframe in accordance with the first configuration information and the one subframe is determined as a special subframe in accordance with the second configuration information, receiving, by the UE, the data using the one subframe as the downlink subframe and the special subframe.

The UE in the embodiments of the present disclosure receives the data in accordance with the first configuration for the dynamic subframe and the second configuration information in the system information by using the subframe as the downlink subframe and/or the special subframe, so as to improve the resource utilization rate during the data reception.

Optionally, the step of receiving, by the UE, the data using the one subframe as the downlink subframe and the special subframe includes receiving, by the UE, the data via all symboles in a first resource of the one subframe and a downlink symbol in a special subframe format in a second resource of the one subframe.

Optionally, before, for one subframe, receiving, by the UE, the data using the one subframe as the downlink subframe when the one subframe is determined as the downlink subframe in accordance with the first configuration information and the one subframe is determined as the downlink subframe in accordance with the second configuration information, the method further includes: determining, by the UE, that the UE is configured by a network-side device to receive the data using the one subframe as the downlink subframe.

Before, for one subframe, receiving, by the UE, the data using the one subframe as the special subframe when the one subframe is determined as the special subframe in accordance with the first configuration information and the one subframe is determined as the special subframe in accordance with the second configuration information, the method further includes: determining, by the UE, that the UE is configured by the network-side device to receive the data using the one subframe as the special subframe.

Before, for one subframe, receiving, by the UE, the data using the one subframe as the downlink subframe and the special subframe when the one subframe is determined as the downlink subframe in accordance with the first configuration information and the subframe is determined as the special subframe in accordance with the second configuration information, the method further includes: determining, by the UE, that the UE is configured by the network-side device to receive the data using the one subframe as the downlink subframe and the special subframe.

According to the embodiments of the present disclosure, d is able for the UE to receive the data in respective modes in accordance with the configuration at a network side, thereby to improve the flexibility during the data reception.

Optionally, the method further includes: after the UE determines that the UE is configured by the network-side device to receive the data in accordance with uplink/downlink subframe configuration, receiving, by the UE, the data in accordance with the second configuration information; or, after the UE determines that the UE is configured by the network-side device to receive the data in accordance with dynamic subframe configuration, receiving, by the UE, the data in accordance with the first configuration information.

According to the embodiments of the present disclosure, it is able for the UE to receive the data in respective modes in accordance with the configuration at a network side, thereby to improve the flexibility during the data reception.

Optionally, the first configuration information includes information of conversion of the downlink subframe configured in the second configuration information into the special subframe and/or information of conversion of the special subframe configured in the second configuration information into the downlink subframe.

In another aspect, the present disclosure provides in some embodiments a method for transmitting data including steps of: determining, by a network-side device, first configuration information for a dynamic subframe corresponding to a UE and second configuration information in system information corresponding to the UE; and transmitting, by the network-side device, data to the UE in accordance with the first configuration information and the second configuration information.

According to the method in the embodiments of the present disclosure, the network-side device transmits the data to the UE in accordance with the first configuration information for the dynamic subframe corresponding to the UE and the second configuration information in the system information corresponding to the UE, so that the UE may receive the data within an identical subframe on the basis of different frame structures in the case of the known second configuration information. As a result, it is able to improve the resource utilization rate during the data reception.

Optionally, the step of transmitting, by the network-side device, the data to the UE in accordance with the first configuration information and the second configuration information includes: for one subframe, when the one subframe is determined as a downlink subframe in accordance with the first configuration information and the one subframe is determined as the downlink subframe in accordance with the second configuration information, transmitting, by the network-side device, the data to the UE using the one subframe as the downlink subframe; or, for one subframe, when the one subframe is determined as a special subframe in accordance with the first configuration information and the one subframe is determined as a downlink subframe in accordance with the second configuration information, transmitting, by the network-side device, the data to the UE using the subframe as the special subframe; or, for one subframe, when the one subframe is determined as a special subframe in accordance with the first configuration information and the one subframe is determined as the special subframe in accordance with the second configuration information, transmitting, by the network-side device, the data to the UE using the one subframe as the special subframe; or, for one subframe, when the one subframe is determined as a downlink subframe in accordance with the first configuration information and the one subframe is determined as a special subframe in accordance with the second configuration information, transmitting, by the network-side device, the data to the UE using the one subframe as the downlink subframe and the special subframe.

The network-side device in the embodiments of the present disclosure transmits the data to the UE in accordance with the first configuration for the dynamic subframe and the second configuration information in the system information, so as to improve the resource utilization rate during the data transmission.

Optionally, the step of transmitting, by the network-side device, the data to the UE using the subframe as the downlink subframe and the special subframe includes transmitting, by the network-side device, the data to the UE via all symbols in a first resource of the subframe and a downlink symbol in a special subframe format in a second resource of the subframe.

Optionally, before, for one subframe, transmitting, by the network-side device, the data to the UE using the one subframe as the downlink subframe when the one subframe is determined as the downlink subframe in accordance with the first configuration information and the one subframe is determined as the downlink subframe in accordance with the second configuration information, the method further includes: configuring, by the network-side device, the UE to receive the data using the one subframe as the downlink subframe.

Before, for one subframe, transmitting, by the network-side device to the UE using the one subframe as the special subframe when the one subframe is determined as the special subframe in accordance with the first configuration information and the one subframe is determined as the downlink subframe in accordance with the second configuration information, the method further includes: configuring, by the network-side device, the LTE to receive the data using the one subframe as the special subframe.

Before, for one subframe, transmitting, by the network-side device, the data to the UE using the one subframe as the special subframe when the one subframe is determined as the special subframe in accordance with the first configuration information and the one subframe is determined as the special subframe in accordance with the second configuration information, the method further includes: configuring, by the network-side device, the UE to receive the data using the one subframe as the downlink subframe and the special subframe.

According to the embodiments of the present disclosure, it is able for the network-side device to configure respective modes for the UE to receive the data, thereby to improve the flexibility during the data transmission.

Optionally, the method further includes: configuring, by the network-side device, the UE to receive the data in accordance with uplink/downlink subframe configuration, thereby to enable the UE to receive the data in accordance with the second configuration information; or configuring, by the network-side device, the UE to receive the data in accordance with dynamic subframe configuration, thereby to enable the UE to receive the data in accordance with the first configuration information.

According to the embodiments of the present disclosure, it is able for the network-side device to configure the respective modes for the UE to receive the data, thereby to improve the flexibility during the data transmission.

Optionally, the first configuration information includes information of conversion of the downlink subframe configured in the second configuration information into the special subframe and/or information of conversion of the special subframe configured in the second configuration information into the downlink subframe.

In yet another aspect, the present disclosure provides in some embodiments a UE for receiving data, including: a first determination module configured to determine first configuration information for a dynamic subframe and second configuration information in system information; and a reception module configured to receive data in accordance with the first configuration information and the second configuration information.

According to the embodiments of the present disclosure, the UE receives the data in accordance the first configuration information for the dynamic subframe and the second configuration information in the system information, so that the UE may receive the data within an identical subframe on the basis of different frame structures in the case of the known second configuration information. As a result, it is able to improve the resource utilization rate during the data reception.

Optionally, the reception module is configured to: for one subframe, when the one subframe is determined as a downlink subframe in accordance with the first configuration information and the one subframe is determined as the downlink subframe in accordance with the second configuration information, receive the data using the one subframe as the downlink subframe; or, for one subframe, when the one subframe is determined as a special subframe in accordance with the first configuration information and the one subframe is determined as a downlink subframe in accordance with the second configuration information, receive the data using the one subframe as the special subframe; or, for one subframe, when the one subframe is determined as a special subframe in accordance with the first configuration information and the one subframe is determined as the special subframe in accordance with the second configuration information, receive the data using the one subframe as the special subframe; or, for one subframe, when the one subframe is determined as a downlink subframe in accordance with the first configuration information and the one subframe is determined as a special subframe in accordance with the second configuration information, receive the data using the one subframe as the downlink subframe and the special subframe.

The UE in the embodiments of the present disclosure receives the data in accordance with the first configuration for the dynamic subframe and the second configuration information in the system information by using the subframe as the downlink subframe and/or the special subframe, so as to improve the resource utilization rate during the data reception.

Optionally, the reception module is configured to receive the data via all symboles in a first resource of the subframe and a downlink symbol in a special subframe format in a second resource of the subframe.

Optionally, the reception module is configured to: after the UE is configured by the network-side device to receive the data using the subframe as the downlink subframe, for one subframe, receive the data using the one subframe as the downlink subframe when the one subframe is determined as the downlink subframe in accordance with the first configuration information and the one subframe is determined as the downlink subframe in accordance with the second configuration information; or, after the UE is configured by the network-side device to receive the data using the subframe as the special subframe, for one subframe, receive the data using the one subframe as the special subframe when the one subframe is determined as the special subframe in accordance with the first configuration information and the one subframe is determined as the special subframe in accordance with the second configuration information; or, after the UE is determined by the network-side device to receive the data using the subframe as the downlink subframe and the special subframe, for one subframe, receive the data using the one subframe as e downlink subframe and the special subframe when the one subframe is determined as the downlink subframe in accordance with the first configuration information and the one subframe is determined as the special subframe in accordance with the second configuration information.

According to the embodiments of the present disclosure, it is able for the UE to receive the data in respective modes in accordance with the configuration at a network side, thereby to improve the flexibility during the data reception.

Optionally, the reception module is further configured to: after the UE is configured by the network-side device to receive the data in accordance with uplink/downlink subframe configuration, receive the data in accordance with the second configuration information; or after the UE is configured by the network-side device to receive the data in accordance with dynamic subframe configuration, receive the data in accordance with the first configuration information.

Optionally, the first configuration information includes information of conversion of the downlink subframe configured in the second configuration information into the special subframe and/or information of conversion of the special subframe configured in the second configuration information into the downlink subframe.

In still yet another aspect, the present disclosure provides in some embodiments a network-side device for transmitting data, including: a second determination module configured to determine first configuration information for a dynamic subframe corresponding to a UE and second configuration information in system information corresponding to the UE; and a transmission module configured to transmit data to the UE in accordance with the first configuration information and the second configuration information.

According to the embodiments of the present disclosure, the network-side device transmits the data to the UE in accordance with the first configuration information for the dynamic subframe corresponding to the UE and the second configuration information in the system information corresponding to the UE, so that the UE may receive the data within an identical subframe on the basis of different frame structures in the case of the known second configuration information. As a result, it is able to improve the resource utilization rate during the data reception.

Optionally, the transmission module is configured to: for one subframe, when the subframe is determined as a downlink subframe in accordance with the first configuration information and the subframe is determined as the downlink subframe in accordance with the second configuration information, transmit the data to the UE using the subframe as the downlink subframe; or, for one subframe, when the subframe is determined as a special subframe in accordance with the first configuration information and the subframe is determined as a downlink subframe in accordance with the second configuration information, transmit the data to the UE using the subframe as the special subframe; or, for one subframe, when the subframe is determined as a special subframe in accordance with the first configuration information and the subframe is determined as the special subframe in accordance with the second configuration information, transmit the data to the UE using the subframe as the special subframe; or, for one subframe, when the subframe is determined as a downlink subframe in accordance with the first configuration information and the subframe is determined as a special subframe in accordance with the second configuration information, transmit the data to the UE using the subframe as the downlink subframe and the special subframe.

The network-side device in the embodiments of the present disclosure transmits the data to the UE in accordance with the first configuration for the dynamic subframe and the second configuration information in the system information, so as to improve the resource utilization rate during the data transmission.

Optionally, the transmission module is configured to transmit the data to the UE via all symbols in a first resource of the subframe and a downlink symbol in a special subframe format in a second resource of the subframe.

Optionally, the transmission module is configured to: after the UE is configured to receive the data using the subframe as the downlink subframe, for one subframe, transmit the data to the UE using the one subframe as the downlink subframe when the one subframe is determined as the downlink subframe in accordance with the first configuration information and the one subframe is determined as the downlink subframe in accordance with the second configuration information; or, after the UE is configured to receive the data using the subframe as the special subframe, for one subframe, transmit the data to the UE using the one subframe as the special subframe when the one subframe is determined as the special subframe in accordance with the first configuration information and the one subframe is determined as the downlink subframe in accordance with the second configuration information; or, after the UE is configured to receive the data using the subframe as the downlink subframe and the special subframe, for one subframe, transmit the data to the UE using the one subframe as the special subframe when the one subframe is determined as the special subframe in accordance with the first configuration information and the subframe is determined as the special subframe in accordance with the second configuration information.

According to the embodiments of the present disclosure, d is able for the network-side device to configure respective modes for the UE to receive the data, thereby to improve the flexibility during the data transmission.

Optionally, the transmission module is further configured to: configure the UE to receive the data in accordance with the uplink/downlink subframe configuration, thereby to enable the UE to receive the data in accordance with the second configuration information, or configure the UE to receive the data in accordance with the dynamic subframe configuration, thereby to enable the UE to receive the data in accordance with the first configuration information.

Optionally, the first configuration information includes information of conversion of the downlink subframe configured in the second configuration information into the special subframe and/or information of conversion of the special subframe configured in the second configuration information into the downlink subframe.

In still yet another aspect, the present disclosure provides in some embodiments a network-side device, including: a processor configured to determine first configuration information for a dynamic subframe corresponding to a UE and second configuration information in system information corresponding to the UE, and transmit data to the UE via a transceiver in accordance with the first configuration information and the second configuration information; and the transceiver configured to receive and transmit the data under the control of the processor.

In still yet another aspect, the present disclosure provides in some embodiments a UE, including: a processor configured to determine first configuration information for a dynamic subframe and second configuration information in system information, and receive data via a transceiver in accordance with the first configuration information and the second configuration information; and the transceiver configured to receive and transmit the data under the control of the processor.

In still yet another aspect, the present disclosure provides in some embodiments a system for receiving data, including: a network-side device configured to determine first configuration information for a dynamic subframe corresponding to a UE and second configuration information in system information corresponding to the UE, and transmit data to the UE in accordance with the first configuration information and the second configuration information; and the UE configured to determine the first configuration information for the dynamic subframe and the second configuration information in the system information, and receive the data in accordance with the first configuration information and the second configuration information.

According to the embodiments of the present disclosure, the UE receives the data in accordance with the first configuration information for the dynamic subframe and the second configuration information in the system information, so that the UE may receive the data within an identical subframe on the basis of different frame structures in the case of the known second configuration information. As a result, it is able to improve the resource utilization rate during the data reception.

DETAILED DESCRIPTION

According to the embodiments of the present disclosure, a UE determines first configuration information for a dynamic subframe and second configuration information in system information, and receives data in accordance with the first configuration information and the second configuration information, so that the UE may receive the data within an identical subframe on the basis of different frame structures in the case of the known second configuration information. As a result, it is able to improve the resource utilization rate during the data reception.

The embodiments of the present disclosure will be described hereinafter in conjunction with the drawings.

Figure 1:
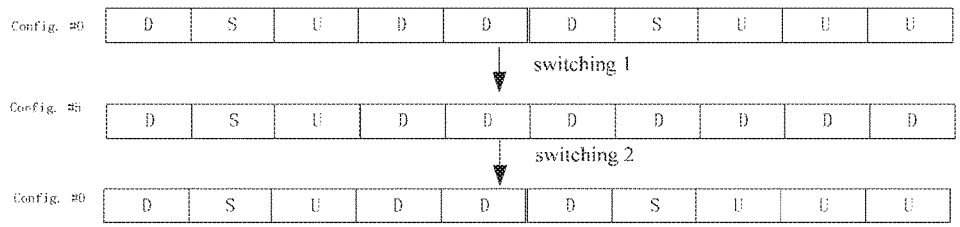
FIG. 1 is a schematic view showing the change of dynamic uplink/downlink subframes in the related art.
Figure 2:
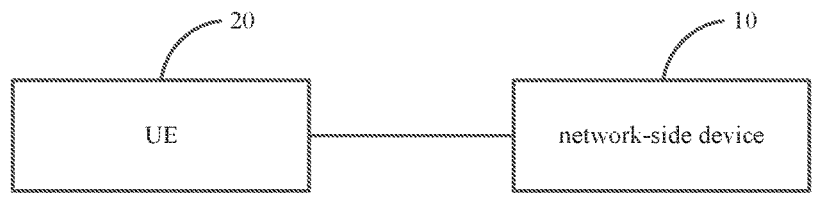
FIG. 2 is a schematic view showing a system for receiving data according to one embodiment of the present disclosure.

As shown in FIG. 2, the present disclosure provides in some embodiments a system for receiving data, which includes a network-side device 10 and a UE 20.

The network-side device 10 is configured to determine first configuration information for a dynamic subframe corresponding to the UE and second configuration information in system information corresponding to the UE, and transmit data to the UE in accordance with the first configuration information and the second configuration information.

The UE 20 is configured to determine the first configuration information for the dynamic subframe and the second configuration information in the system information, and receive the data in accordance with the first configuration information and the second configuration information.

During the implementation, the second configuration information is equivalent to TDD uplink/downlink subframe configuration in an existing system, which is available for both a traditional UE (by which the first configuration information cannot be identified and the second configuration information can be identified) and a novel UE (by which both the first configuration information and the second configuration information can be identified).

The first configuration information (i.e., the changed uplink/downlink subframe configuration) may be indicated by dynamic or semi-static signaling, depending on a change frequency of the subframe configuration.

There are various modes for the data transmission between the network-side device and the UE in accordance with the first configuration information and the second configuration information, and some of them will be described hereinafter.

Mode 1: for one subframe, when the subframe is determined as a downlink subframe in accordance with the first configuration information and the subframe is determined as the downlink subframe in accordance with the second configuration information, the data is transmitted by the network-side device to the UE using the subframe as the downlink subframe.

Correspondingly, for one subframe, when the subframe is determined as a downlink subframe in accordance with the first configuration information and the subframe is determined as the downlink subframe in accordance with the second configuration information, the data is received by the UE using the subframe as the downlink subframe.

To be specific, when the data is transmitted by the network-side device to the UE using the subframe as the downlink subframe, the data may be transmitted via all symbols in the subframe. Correspondingly, when the data is received by the UE using the subframe as the downlink subframe, the data may be received via all the symbols in the subframe.

Mode 2: for one subframe, when the subframe is determined as a special subframe in accordance with the first configuration information and the subframe is determined as a downlink subframe in accordance with the second configuration information, the data is transmitted by the network-side device to the UE using the subframe as the special subframe.

Correspondingly, for one subframe, when the subframe is determined as a special subframe in accordance with the first configuration information and the subframe is determined as a downlink subframe in accordance with the second configuration information, the data is received by the UE using the subframe as the special subframe.

To be specific, when the data is transmitted by the network-side device to the UE using the subframe as the special subframe, the data may be transmitted via a downlink symbol specified in a special subframe format of the subframe. Correspondingly, when the data is received by the UE using the subframe as the special subframe, the data may be received via a downlink symbol specified in a special subframe format of the subframe.

Mode 3: for one subframe, when the subframe is determined as a special subframe in accordance with the first configuration information and the subframe is determined as the special subframe in accordance with the second configuration information, the data is transmitted by the network-side device to the UE using the subframe as the special subframe.

Correspondingly, for one subframe, when the subframe is determined as a special subframe in accordance with the first configuration information and the subframe is determined as the special subframe in accordance with the second configuration information, the data is received by the UE using the subframe as the special subframe.

To be specific, when the data is transmitted by the network-side device to the UE using the subframe as the special subframe, the data may be transmitted via a downlink symbol specified in a special subframe format of the subframe. Correspondingly, when the data is received by the UE using the subframe as the special subframe the data may be received via a downlink symbol specified in a special subframe format of the subframe.

Mode 4: for one subframe, when the subframe is determined as a downlink subframe in accordance with the first configuration information and the subframe is determined as a special subframe in accordance with the second configuration information, the data is transmitted by the network-side device to the UE using the subframe as the downlink subframe and the special subframe.

Correspondingly, for one subframe, when the subframe is determined as a downlink subframe in accordance with the first configuration information and the subframe is determined as a special subframe in accordance with the second configuration information, the data is received by the UE using the subframe as the downlink subframe and the special subframe.

To be specific, the data may be transmitted via all symboles in a first resource of the subframe and a downlink symbol specified in a special subframe format in a second resource of the subframe. Correspondingly, the data may be received via all symbols in the first resource of the subframe and a downlink symbol specified in a special subframe format in the second resource of the subframe.

The above four modes are shown in Table 1.

TABLE 1

| Current subframe configuration in system information (second configuration information) | Dynamic subframe configuration (first configuration information) | Mode |
|---|---|---|
| Downlink | Downlink | Mode 1 |
| Downlink | Special | Mode 2 |
| Special | Special | Mode 3 |
| Special | Downlink | Mode 4 |

Figure 9:
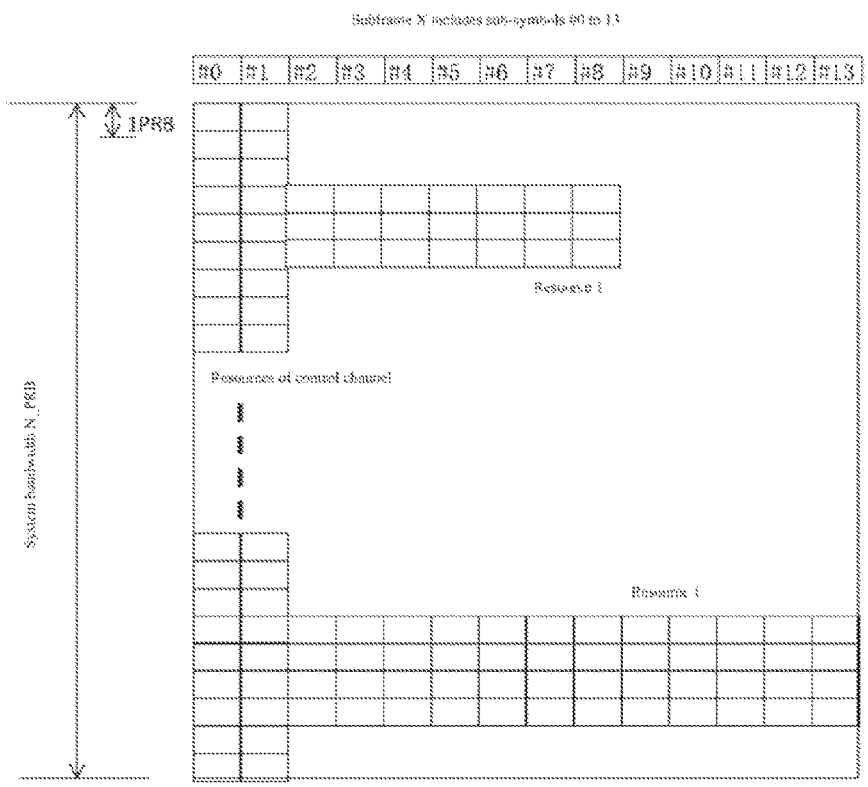
FIG. 9 is a schematic view showing the situation where the data is received in two modes within an identical subframe according to one embodiment of the present disclosure.

In mode 4, the UE is required to receive the data within an identical subframe in different subframe formats. As shown in FIG. 9, it is hypothesized that a subframe X of a current radio frame includes 14 Orthogonal Frequency Division Multiplexing (OFDM) symbols and two preceding symbols are occupied by Physical Downlink Control Channel (PDCCH). In FIG. 9, a special subframe configured in the system information includes 9 OFDM symbols (e.g., special subframe configuration #1). By searching control channel, both paging information and dedicated data are detected by the UE concurrently. At this time, in the current radio frame, the paging information and the dedicated data are received by the UE over two different resources (resource 1 and resource 2), respectively, on the basis of two frame format hypotheses.

The above are described by taking the paging information and the dedicated data an example. Of course, according to the practical need, any other information. e.g., system information or public control information shared by cells, may also be transmitted via the symbols.

During the implementation, the network-side device may configure a specific mode for the UE, and the operations may be performed by the UE when the conditions desired for the mode are met and the mode is configured for the UE.

Configuration #1: the UE is configured by the network-side device to receive the data using the subframe as the downlink subframe.

Correspondingly, after the UE is configured by the network-side device to receive the data using the subframe as the downlink subframe, for one subframe, the UE receives the data using the one subframe as the downlink subframe when the one subframe is determined as the downlink subframe in accordance with the first configuration information and the one subframe is determined as the downlink subframe in accordance with the second configuration information.

Configuration #2: the UE is configured by the network-side device to receive the data using the subframe as the special subframe.

Correspondingly, after the UE is configured by the network-side device to receive the data using the subframe as the special subframe, for one subframe, the UE receives the data using the one subframe as the special subframe when the one subframe is determined as the special subframe in accordance with the first configuration information and the one subframe is determined as the special subframe in accordance with the second configuration information.

Configuration #3: the UE is configured by the network-side device to receive the data using the subframe as the downlink subframe and the special subframe.

Correspondingly, after the UE is configured by the network-side device to receive the data using the subframe as the downlink subframe and the special subframe, for one subframe, the UE receives the data using the one subframe as the downlink subframe and the special subframe when the one subframe is determined as the downlink subframe in accordance with the first configuration information and the one subframe is determined as the special subframe in accordance with the second configuration information.

Configuration #4: the UE is configured by the network-side device to receive the data in accordance with the uplink/downlink subframe configuration, thereby to receive the data in accordance with the second configuration information.

Correspondingly, after the the UE is configured by the network-side device to receive the data in accordance with the uplink/downlink subframe configuration, the UE receives the data in accordance with the second configuration information.

Configuration #5: the UE is configured by the network-side device to receive the data in accordance with the dynamic subframe configuration, thereby to receive the data in accordance with the first configuration information.

Correspondingly, after the UE is configured by the network-side device to receive the data in accordance with the dynamic subframe configuration, the UE receives the data in accordance with the first configuration information.

During the implementation, one or more of the above configurations may be adopted according to the practical need.

For example, when configuration #3 is adopted and when one subframe is determined as the downlink subframe in accordance with the first configuration information and the one subframe is determined as the special subframe in accordance with the second configuration information, the UE may receive the data using the one subframe as the downlink subframe and the special subframe.

During the implementation, the network-side device may acquire the first configuration information and the second configuration information, so when the UE is configured by the network-side device, such a contradiction where, e.g., configuration #3 is adopted but for one subframe, the UE determines the one subframe as the special subframe in accordance with the first configuration information and determines the one subframe as the special subframe in accordance with the second configuration information, may not occur.

Hence, the UE is configured by the network-side device in accordance with the first configuration information and the second configuration information.

For example, when the network-side device determines the subframe as the special subframe in accordance with the first configuration information and determines the subframe as the special subframe in accordance with the second configuration information, an identical result may also be acquired by the UE. At this time, configuration #2, configuration #4 or configuration #5 may be adopted.

Optionally, in the embodiments of the present disclosure, the first configuration information includes information about the conversion of the downlink subframe configured in the second configuration information into the special subframe and/or information about the conversion of the special subframe configured in the second configuration information into the downlink subframe.

For example, subframe 5 is configured in the second configuration information as a downlink subframe, and the first configuration information includes information about the conversion of subframe 5 into a special subframe.

Figure 3:
FIG. 3 is a schematic view showing a network-side device in the system for receiving data according to one embodiment of the present disclosure.

As shown in FIG. 3, the present disclosure provides in some embodiments the network-side device in the system for receiving data, which includes a second determination module 300 and a transmission module 310.

The second determination module 300 is configured to determine first configuration information for a dynamic subframe corresponding to the UE and second configuration information in system information corresponding to the UE.

The transmission module 310 is configured to transmit data to the UE in accordance with the first configuration information and the second configuration information.

Optionally, the transmission module) is configured to: for one subframe, when the subframe is determined as a downlink subframe in accordance with the first configuration information and the subframe is determined as the downlink subframe in accordance with the second configuration information, transmit the data to the UE using the subframe as the downlink subframe; or, for one subframe, when the subframe is determined as a special subframe in accordance with the first configuration information and the subframe is determined as a downlink subframe in accordance with the second configuration information, transmit the data to the UE using the subframe as the special subframe; or, for one subframe, when the subframe is determined as a special subframe in accordance with the first configuration information and the subframe is determined as the special subframe in accordance with the second configuration information, transmit the data to the UE using the subframe as the special subframe; or, for one subframe, when the subframe is determined as a downlink subframe in accordance with the first configuration information and the subframe is determined as a special subframe in accordance with the second configuration information, transmit the data to the UE using the subframe as the downlink subframe and the special subframe.

Optionally, the transmission module 310 is configured to transmit the data to the UE via all symbols in a first resource of the subframe and a downlink symbol in a special subframe format in a second resource of the subframe.

Optionally, the transmission module 310 is configured to: after the UE is configured to receive the data using the subframe as the downlink subframe, for one subframe, transmit the data to the UE using the one subframe as the downlink subframe when the one subframe is determined as the downlink subframe in accordance with the first configuration information and the one subframe is determined as the downlink subframe in accordance with the second configuration information; or, after the UE is configured to receive the data using the subframe as the special subframe, for one subframe, transmit the data to the UE using the one subframe as the special subframe when the one subframe is determined as the special subframe in accordance with the first configuration information and the one subframe is determined as the downlink subframe in accordance with the second configuration information; or, after the UE is configured to receive the data using the subframe as the downlink subframe and the special subframe, for one subframe, transmit the data to the UE using the subframe as the special subframe when the one subframe is determined as the special subframe in accordance with the first configuration information and the subframe is determined as the special subframe in accordance with the second configuration information.

Optionally, the transmission module 310 is further configured to: configure the UE to receive the data in accordance with the uplink/downlink subframe configuration, thereby to enable the UE to receive the data in accordance with the second configuration information, or, configure the UE to receive the data in accordance with the dynamic subframe configuration, thereby to enable the UE to receive the data in accordance with the first configuration information.

Optionally, the first configuration information includes information about the conversion of the downlink subframe configured in the second configuration information into the special subframe and/or information about the conversion of the special subframe configured in the second configuration information into the downlink subframe.

Figure 4:
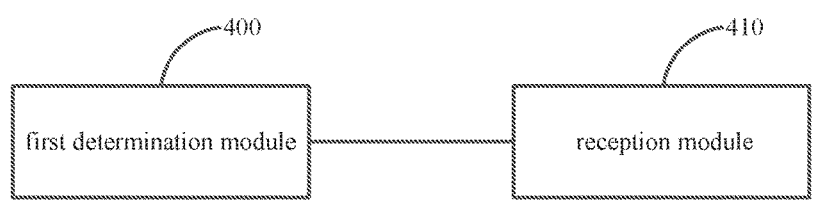
FIG. 4 is a schematic view showing a UE in the system for receiving data according to one embodiment of the present disclosure.

As shown in FIG. 4, the present disclosure provides in some embodiments the UE in the system for receiving data, which includes a first determination module 400 and a reception nodule 410.

The first determination module 400 is configured to determine first configuration information for a dynamic subframe and second configuration information in system information.

The reception module 410 is configured to receive data in accordance with the first configuration information and the second configuration information.

Optionally, the reception module 410 is configured to: for one subframe, when the subframe is determined as a downlink subframe in accordance with the first configuration information and the subframe is determined as the downlink subframe in accordance with the second configuration information, receive the data using the subframe as the downlink subframe; or, for one subframe, when the subframe is determined as a special subframe in accordance with the first configuration information and the subframe is determined as a downlink subframe in accordance with the second configuration information, receive the data using the subframe as the special subframe; or, for one subframe, when the subframe is determined as a special subframe in accordance with the first configuration information and the subframe is determined as the special subframe in accordance with the second configuration information, receive the data using the subframe as the special subframe; or, for one subframe, when the subframe is determined as a downlink subframe in accordance with the first configuration information and the subframe is determined as a special subframe in accordance with the second configuration information, receive the data using the subframe as the downlink subframe and the special subframe.

Optionally, the reception module 410 is configured to receive the data via all symboles in a first resource of the subframe and a downlink symbol in a special subframe format in a second resource of the subframe.

Optionally, the reception module 410 is further configured to: after the UE is configured by the network-side device to receive the data using the subframe as the downlink subframe, for one subframe, receive the data using the one subframe as the downlink subframe when the one subframe is determined as the downlink subframe in accordance with the first configuration information and the one subframe is determined as the downlink subframe in accordance with the second configuration information; or, after the UE is configured by the network-side device to receive the data using the subframe as the special subframe, for one subframe, receive the data using the one subframe as the special subframe when the one subframe is determined as the special subframe in accordance with the first configuration information and the one subframe is determined as the special subframe in accordance with the second configuration information; or, after the UE is configured by the network-side device to receive the data using the subframe as the downlink subframe and the special subframe, for one subframe, receive the data using the one subframe as the downlink subframe and the special subframe when the one subframe is determined as the downlink subframe in accordance with the first configuration information and the one subframe is determined as the special subframe in accordance with the second configuration information.

Optionally, the reception module 410 is further configured to: after the UE is configured by the network-side device to receive the data in accordance with uplink/downlink subframe configuration, receive the data in accordance with the second configuration information; or, after the UE is configured by the network-side device to receive the data in accordance with dynamic subframe configuration, receive the data in accordance with the first configuration information.

Optionally, the first configuration information includes information about the conversion of the downlink subframe configured in the second configuration information into the special subframe and/or information about the conversion of the special subframe configured in the second configuration information into the downlink subframe.

Figure 5:
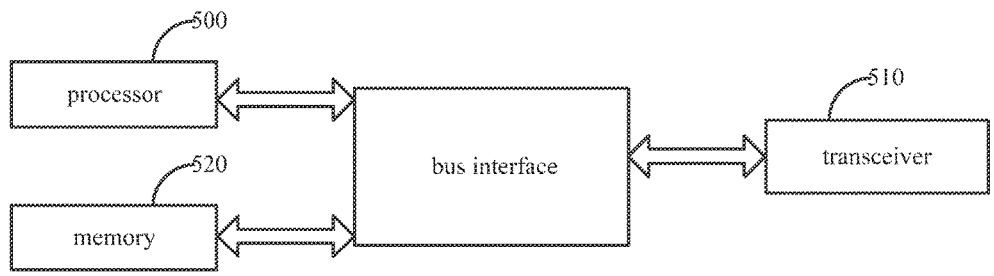
FIG. 5 is another schematic view showing the network-side device in the system for receiving data according to one embodiment of the present disclosure.

As shown in FIG. 5, the present disclosure provides in some embodiments the network-side device in the system for receiving data, which includes: a processor 500 configured to determine first configuration information for a dynamic subframe corresponding to a UE and second configuration information in system information corresponding to the UE, and transmit data to the UE via a transceiver 510 in accordance with the first configuration information and the second configuration information; and the transceiver 510 configured to receive and transmit data under the control of the processor 500.

Optionally, the processor 500 is configured to: for one subframe, when the subframe is determined as a downlink subframe in accordance with the first configuration information and the subframe is determined as the downlink subframe in accordance with the second configuration information, transmit the data via the transceiver 510 to the UE using the subframe as the downlink subframe; or, for one subframe, when the subframe is determined as a special subframe in accordance with the first configuration information and the subframe is determined as a downlink subframe in accordance with the second configuration information, transmit the data via the transceiver 510 to the UE using the subframe as the special subframe; or, for one subframe, when the subframe is determined as a special subframe in accordance with the first configuration information and the subframe is determined as the special subframe in accordance with the second configuration information, the data via the transceiver 510 to the UE using the subframe as the special subframe; or, for one subframe. When the subframe is determined as a downlink subframe in accordance with the first configuration information and the subframe is determined as a special subframe in accordance with the second configuration information, transmit the data via the transceiver 510 to the UE using the subframe as the downlink subframe and the special subframe.

Optionally, the processor 500 is configured to transmit the data via the transceiver 510 to the UE via all symbols in a first resource of the subframe and a downlink symbol a special subframe format in a second resource of the subframe.

Optionally, the processor 500 is configured to: after the UE is configured to receive the data using the subframe as the downlink subframe, for one subframe, transmit the data via the transceiver 510 to the UE using the one subframe as the downlink subframe when the one subframe is determined as a downlink subframe in accordance with the first configuration information and the one subframe is determined as the downlink subframe in accordance with the second configuration information; or, after the UE is configured to receive the data using the subframe as the special subframe, for one subframe, transmit the data via the transceiver 510 to the UE using the one subframe as the special subframe when the one subframe is determined as the special subframe in accordance with the first configuration information and the one subframe is determined as the downlink subframe in accordance with the second configuration information; or after the UE is configured to receive the data using the subframe as the downlink subframe and the special subframe, for one subframe, transmit the data via the transceiver 510 to the UE using the one subframe as the special subframe when the one subframe is determined as the downlink subframe in accordance with the first configuration information and the one subframe is determined as the special subframe in accordance with the second configuration information.

Optionally, the processor 500 is further configured to configure the UE to receive the data in accordance with the uplink/downlink subframe configuration, thereby to enable the UE to receive the data in accordance with the second configuration information, or configure the UE to receive the data in accordance with the dynamic subframe configuration, thereby to enable the UE to receive the data in accordance with the first configuration information.

Optionally, the first configuration information includes information about the conversion of the downlink subframe configured in the second configuration information into the special subframe and/or information about the conversion of the special subframe configured in the second configuration information into the downlink subframe.

In FIG. 5, bus architecture may include interconnected buses and bridges in any amount. To be specific, circuits for one or more processors, represented by the processor 500, are linked to circuits for memories, represented by a memory 520. Further, the bus architecture may include any other interconnected circuits, such as circuits for a peripheral and a voltage stabilizer, and a power management circuit. The above are known in the art, and thus will not be particularly defined herein. Bus interfaces are provided for the interconnection. The transceiver 510 may include several elements, i.e., it may include a transmitter, a receiver and a unit in communication with the other devices over a transmission medium.

The processor 500 may take charge of managing the bus architecture and general processing, and the data for the operation executed by the processor 500 may be stored in the memory 520.

Figure 6:
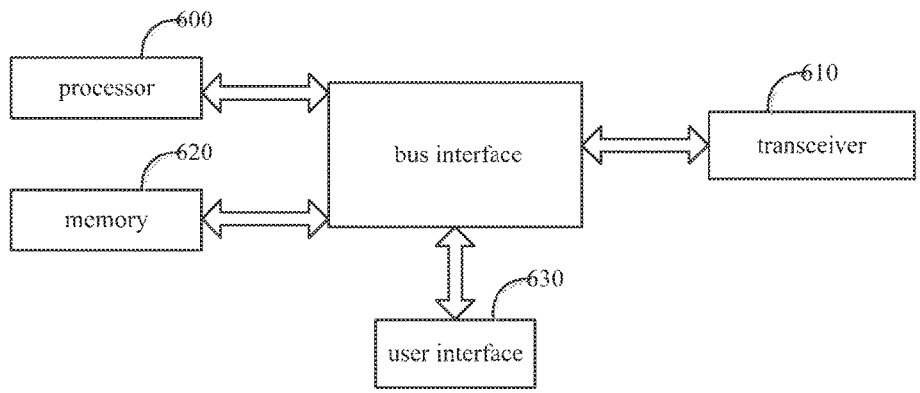
FIG. 6 is another schematic view showing the UE in the system for receiving data according to one embodiment of the present disclosure.

As shown in FIG. 6, the present disclosure provides in some embodiments the UE in the system for receiving data, which includes: a processor 600 configured to determine first configuration information for a dynamic subframe and second configuration information in system information, and receive data via a transceiver 610 in accordance with the first configuration information and the second configuration information; and the transceiver 610 configured to receive and transmit data under the control of the processor 600.

Optionally, the processor 600 is configured to: for one subframe, when the subframe is determined as a downlink subframe in accordance with the first configuration information and the subframe is determined as the downlink subframe in accordance with the second configuration information, receive the data via the transceiver 610 using the subframe as the downlink subframe; or, for one subframe, when the subframe is determined as a special subframe in accordance with the first configuration information and the subframe is determined as a downlink subframe in accordance with the second configuration information, receive the data via the transceiver 610 using the subframe as the special subframe; or, for one subframe, when the subframe is determined as a special subframe in accordance with the first configuration information and the subframe is determined as the special subframe in accordance with the second configuration information, receive the data via the transceiver 610 using the subframe as the special subframe; or, for one subframe, when the subframe is determined as a downlink subframe in accordance with the first configuration information and the subframe is determined as a special subframe in accordance with the second configuration information, receive the data via the transceiver 610 using the subframe as the downlink subframe and the special subframe.

Optionally, the processor 600 is configured to receive the data via the transceiver 610 through all symbols in a first resource of the subframe and a downlink symbol in a special subframe format in a second resource of the subframe.

Optionally, the processor 600 is further configured to: after the UE is configured by the network-side device to receive the data using the subframe as the downlink subframe, for one subframe, receive the data via the transceiver 610 using the one subframe as the downlink subframe when the one subframe is determined as the downlink subframe in accordance with the first configuration information and the one subframe is determined as the downlink subframe in accordance with the second configuration information; or, after the UE is configured by the network-side device to receive the data using the subframe as the special subframe, for one subframe, receive the data via the transceiver 610 using the one subframe as the special subframe when the one subframe is determined as the special subframe in accordance with the first configuration information and the one subframe is determined as the special subframe in accordance with the second configuration information; or, after the UE is determined by the network-side device to receive the data using the subframe as the downlink subframe and the special subframe, for one subframe, receive the data via the transceiver 610 using the one subframe as the downlink subframe and the special subframe when the one subframe is determined as the downlink subframe in accordance with the first configuration information and the one subframe is determined as the special subframe in accordance second configuration information.

Optionally, the processor 600 is further configured to: after the UE is configured by the network-side device to receive the data in accordance with uplink/downlink subframe configuration, receive the data in accordance with the second configuration information, or, after the UE is configured by the network-side device to receive the data in accordance with dynamic subframe configuration, receive the data via the transceiver 610 in accordance with the first configuration information.

Optionally, the first configuration information includes information about the conversion of the downlink subframe configured in the second configuration information into the special subframe and/or information about the conversion of the special subframe configured in the second configuration information into the downlink subframe.

In FIG. 6, bus architecture may include interconnected buses and bridges in any amount. To be specific, circuits for one or more processors, represented by the processor 600, are linked to circuits for memories, represented by a memory 620. Further, the bus architecture may include any other interconnected circuits, such as circuits for a peripheral and a voltage stabilizer, and a power management circuit. The above are known in the art, and thus will not be particularly defined herein. Bus interfaces are provided for the interconnection. The transceiver 610 may include several elements, i.e., it may include a transmitter, a receiver and a unit in communication with the other devices over a transmission medium. With respect to different UEs, a user interface 630 may also be an interface through which desired devices are interfaced with the UE internally or externally, and these devices include but not limited to a keypad, a display, a speaker, a microphone and a joystick.

The processor 600 may take charge of managing the bus architecture and general processing, and the data for the operation executed by the processor 600 may be stored in the memory 620.

Based on an identical inventive concept, the present disclosure further provides in some embodiments methods for transmitting and receiving data. The devices for executing these methods are just those included in the system for receiving data in the above-mentioned embodiments, and the principle of these devices is similar to that of the system, so the implementation of these methods may refer to the above-mentioned embodiments concerning the system and thus will not be repeated herein.

Figure 7:
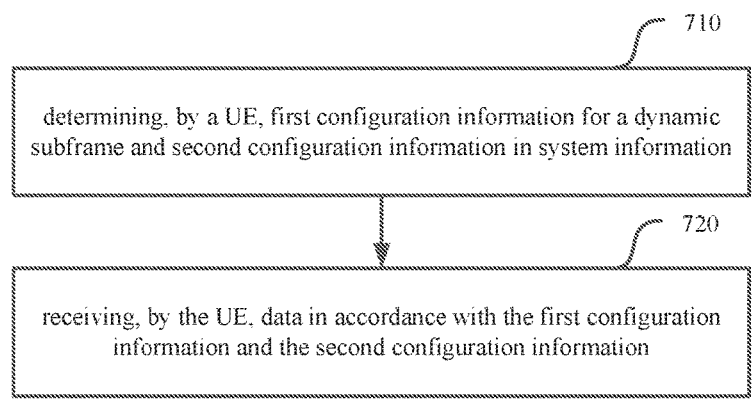
FIG. 7 is a flow chart of a method for receiving data according to one embodiment of the present disclosure.

As shown in FIG. 7, the present disclosure provides in some embodiments a method for receiving data, which includes: Step 710 of determining, by a UE, first configuration information for a dynamic subframe and second configuration information in system information; and Step 702 of receiving, by the UE, data in accordance with the first configuration information and the second configuration information.

Optionally, the step of receiving, by the UE, the data in accordance with the first configuration information and the second configuration information includes: for one subframe, when the one subframe is determined as a downlink subframe in accordance with the first configuration information and the one subframe is determined as the downlink subframe in accordance with the second configuration information, receiving, by the UE, the data using the one subframe as the downlink subframe; or, for one subframe, when the one subframe is determined as a special subframe in accordance with the first configuration information and the one subframe is determined as a downlink subframe in accordance with the second configuration information, receiving, by the UE, the data using the one subframe as the special subframe; or, for one subframe, when the one subframe is determined as a special subframe in accordance with the first configuration information and the one subframe is determined as the special subframe in accordance with the second configuration information, receiving, by the UE, the data using the one subframe as the special subframe, or, for one subframe, when the one subframe is determined as a downlink subframe in accordance with the first configuration information and the one subframe is determined as a special subframe in accordance with the second configuration information, receiving by the UE, the data using the one subframe as the downlink subframe and the special subframe.

Optionally, the step of receiving, by the UE, the data using the one subframe as the downlink subframe and the special subframe includes: receiving, by the UE, the data via all symbols in a first resource of the one subframe and a downlink symbol in a special subframe format in a second resource of the one subframe.

Optionally, before, for one subframe, receiving, by the UE, the data using the one subframe as the downlink subframe when the one subframe is determined as the downlink subframe in accordance with the first configuration information and the one subframe is determined as the downlink subframe in accordance with the second configuration information, the method further includes: determining, by the UE, that the UE is configured by a network-side device to receive the data using the subframe as the downlink subframe.

Before, for one subframe, receiving, by the UE, the data using the one subframe as the special subframe when the one subframe is determined as the special subframe in accordance with the first configuration information and the one subframe is determined as the special subframe in accordance with the second configuration information, the method further includes: determining, by the UE, that the UE is configured by a network-side device to receive the data using the subframe as the special subframe.

Before, for one subframe, receiving, by the UE, the data using the one subframe as the downlink subframe and the special subframe when the one subframe is determined as the downlink subframe in accordance with the first configuration information and the one subframe is determined as the special subframe in accordance with the second configuration information, the method further includes: determining, by the UE, that the UE is configured by a network-side device to receive the data using the subframe as the downlink subframe and the special subframe.

Optionally, the method further includes: after the UE determines that the UE is configured by the network-side device to receive the data in accordance with uplink/downlink subframe configuration, receiving, by the UE, the data in accordance with the second configuration information; or, after the UE determines that the UE is configured by the network-side device to receive the data in accordance with dynamic subframe configuration, receiving, by the UE, the data in accordance with the first configuration information.

Optionally, the first configuration information includes information about the conversion of the downlink subframe configured in the second configuration information into the special subframe and/or information about the conversion of the special subframe configured in the second configuration information into the downlink subframe.

Figure 8:
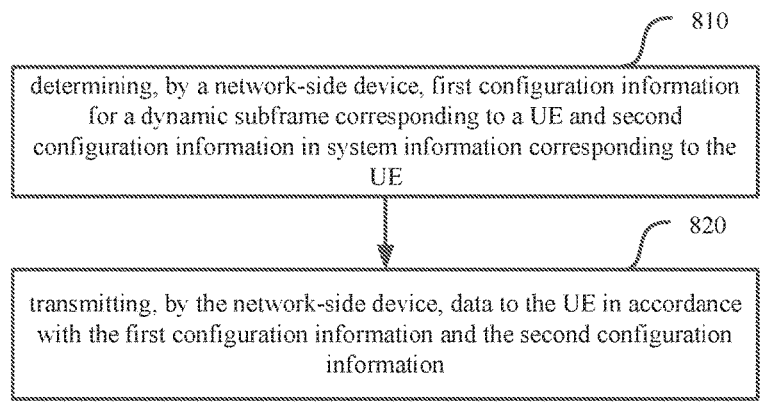
FIG. 8 is a flow chart of a method for transmitting data according to one embodiment of the present disclosure.

As shown in FIG. 8, the present disclosure provides in some embodiments a method for transmitting data, which includes: Step 810 of determining, by a network-side device, first configuration information for a dynamic subframe corresponding to a UE and second configuration information in system information corresponding to the UE; and Step 820 of transmitting, by the network-side device, data to the UE in accordance with the first configuration information and the second configuration information.

Optionally, the step of transmitting, by the network-side device, the data to the UE in accordance with the first configuration information and the second configuration information includes: for one subframe, when the subframe is determined as a downlink subframe in accordance with the first configuration information and the subframe is determined as the downlink subframe in accordance with the second configuration information, transmitting, by the network-side device, the data to the UE using the subframe as the downlink subframe; or, for one subframe, when the subframe is determined as a special subframe in accordance with the first configuration information and the subframe is determined as a downlink subframe in accordance with the second configuration information, transmitting, by the network-side device, the data to the UE using the subframe as the special subframe; or, for one subframe, when the subframe is determined as a special subframe in accordance with the first configuration information and the subframe is determined as the special subframe in accordance with the second configuration information, transmitting, by the network-side device, the data to the UE using the subframe as the special subframe; or, for one subframe, when the subframe is determined as a downlink subframe in accordance with the first configuration information and the subframe is determined as a special subframe in accordance with the second configuration information, transmitting, by the network-side device, the data to the UE using the subframe as the downlink subframe and the special subframe.

Optionally, the step of transmitting, by the network-side device, the data to the UE using the subframe as the downlink subframe and the special subframe includes: transmitting, by the network-side device, the data to the UE via all symboles in a first resource of the subframe and a downlink symbol in a special subframe format in a second resource of the subframe.

Optionally, before, for one subframe, transmitting, by the network-side device, the data to the UE using the subframe as the downlink subframe when the subframe is determined as the downlink subframe in accordance with the first configuration information and the subframe is determined as the downlink subframe in accordance with the second configuration information, the method further includes: configuring, by the network-side device, the UE to receive the data using the subframe as the downlink subframe.

Before, for one subframe, transmitting, by the network-side device to the UE using the subframe as the special subframe when the subframe is determined as the special subframe in accordance with the first configuration information and the subframe is determined as the downlink subframe in accordance with the second configuration information, the method further includes: configuring, by the network-side device, the UE to receive the data using the subframe as the special subframe.

Before, for one subframe, transmitting, by the network-side device, the data to the UE using the subframe as the special subframe when the subframe is determined as the special subframe in accordance with the first configuration information and the subframe is determined as the special subframe in accordance with the second configuration information, the method further includes: configuring, by the network-side device, the UE to receive the data using the subframe as the special subframe.

Before, for one subframe, transmitting, by the network-side device, the data to the UE using the subframe as the downlink subframe and the special subframe when the subframe is determined as a downlink subframe in accordance with the first configuration information and the subframe is determined as a special subframe in accordance with the second configuration information, the method further includes: configuring, by the network-side device, the UE to receive the data using the subframe as the downlink subframe and the special subframe.

Optionally, the method further includes: configuring, by the network-side device, the UE to receive the data in accordance with uplink/downlink subframe configuration, thereby to enable the UE to receive the data in accordance with the second configuration information; or, configuring, by the network-side device, the UE to receive the data in accordance with dynamic subframe configuration, thereby to enable the UE to receive the data in accordance with the first configuration information.

Optionally, the first configuration information includes information about the conversion of the downlink subframe configured in the second configuration information into the special subframe and/or information about the conversion of the special subframe configured in the second configuration information into the downlink subframe.

The methods in FIGS. 7 and 8 may be combined into a method for receiving data, where Step 820 is performed prior to Step 720, and there is no necessary sequential relationship between Steps 710 and 810, as long as Step 710 is performed prior to Step 720 and Step 810 is performed prior to Step 820.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A method for receiving data, comprising:
determining, by a processor of a User Equipment (UE), first configuration information for a dynamic subframe and second configuration information in system information; and
receiving, by the processor of the UE, data in accordance with the first configuration information and the second configuration information;
wherein for one subframe, the receiving of, by the processor of the UE, the data in accordance with the first configuration information and the second configuration information comprises:
receiving, by the processor of the UE, the data using the one subframe as the downlink subframe when the one subframe is determined as a downlink subframe in accordance with the first configuration information and the one subframe is determined as the downlink subframe in accordance with the second configuration information; or,
receiving, by the processor of the UE, the data using the one subframe as the special subframe when the one subframe is determined as a special subframe in accordance with the first configuration information and the one subframe is determined as a downlink subframe in accordance with the second configuration information; or,
receiving, by the processor of the UE, the data using the one subframe as the special subframe when the one subframe is determined as a special subframe in accordance with the first configuration information and the one subframe is determined as the special subframe in accordance with the second configuration information; or,
receiving, by the processor of the UE, the data using the one subframe as the downlink subframe and the special subframe when the one subframe is determined as a downlink subframe in accordance with the first configuration information and the one subframe is determined as a special subframe in accordance with the second configuration information;
wherein the receiving of, by the processor of the UE, the data using the one subframe as the downlink subframe and the special subframe comprises: receiving, by the processor of the UE, the data via all symbols in a first resource of the one subframe and a downlink symbol in a special subframe format in a second resource of the one subframe.

2. The method according to claim 1, wherein before, for the one subframe, receiving, by the processor of the UE, the data using the one subframe as the downlink subframe when the one subframe is determined as the downlink subframe in accordance with the first configuration information and the one subframe is determined as the downlink subframe in accordance with the second configuration information, the method further comprises: determining, by the processor of the UE, that the UE is configured by a network-side device to receive the data using the one subframe as the downlink subframe; before, for the one subframe, receiving, by the processor of the UE, the data using the one subframe as the special subframe when the one subframe is determined as the special subframe in accordance with the first configuration information and the one subframe is determined as the downlink subframe in accordance with the second configuration information, the method further comprises: determining, by the processor of the UE, that the UE is configured by the network-side device to receive the data using the one subframe as the special subframe; before, for the one subframe, receiving, by the processor of the UE, the data using the one subframe as the special subframe when the one subframe is determined as the special subframe in accordance with the first configuration information and the one subframe is determined as the special subframe in accordance with the second configuration information, the method further comprises: determining, by the processor of the UE, that the UE is configured by the network-side device to receive the data using the one subframe as the special subframe; and before, for the one subframe, receiving, by the processor of the UE, the data using the one subframe as the downlink subframe and the special subframe when the one subframe is determined as the downlink subframe in accordance with the first configuration information and the subframe is determined as the special subframe in accordance with the second configuration information, the method further includes: determining, by the processor of the UE, that the UE is configured by the network-side device to receive the data using the one subframe as the downlink subframe and the special subframe.

3. The method according to claim 2, further comprising: after the UE determines that the UE is configured by the network-side device to receive the data in accordance with uplink/downlink subframe configuration, receiving, by the processor of the UE, the data in accordance with the second configuration information; or, after the UE determines that the UE is configured by the network-side device to receive the data in accordance with dynamic subframe configuration, receiving, by the processor of the UE, the data in accordance with the first configuration information.

4. The method according to claim 1, wherein the first configuration information comprises information of conversion of the downlink subframe configured in the second configuration information into the special subframe and/or information of conversion of the special subframe configured in the second configuration information into the downlink subframe.

5. A method for transmitting data, comprising:
determining, by a processor of a network-side device, first configuration information for a dynamic subframe corresponding to a User Equipment (UE) and second configuration information in system information corresponding to the UE; and
transmitting, by the processor of the network-side device, data to the UE in accordance with the first configuration information and the second configuration information;
wherein for one subframe, the transmitting of, by the processor of the network-side device, the data to the UE in accordance with the first configuration information and the second configuration information comprises:
transmitting, by the processor of the network-side device, the data to the UE using the one subframe as the downlink subframe when the one subframe is determined as a downlink subframe in accordance with the first configuration information and the one subframe is determined as the downlink subframe in accordance with the second configuration information; or,
transmitting, by the processor of the network-side device, the data to the UE using the subframe as the special subframe when the one subframe is determined as a special subframe in accordance with the first configuration information and the one subframe is determined as a downlink subframe in accordance with the second configuration information; or,
transmitting, by the processor of the network-side device, the data to the UE using the one subframe as the special subframe when the one subframe is determined as a special subframe in accordance with the first configuration information and the one subframe is determined as the special subframe in accordance with the second configuration information; or,
transmitting, by the processor of the network-side device, the data to the UE using the one subframe as the downlink subframe and the special subframe when the one subframe is determined as a downlink subframe in accordance with the first configuration information and the one subframe is determined as a special subframe in accordance with the second configuration information;
wherein the transmitting of, by the processor of the network-side device, the data to the UE using the one subframe as the downlink subframe and the special subframe comprises:
transmitting, by the processor of the network-side device, the data to the UE via all symbols in a first resource of the one subframe and a downlink symbol in a special subframe format in a second resource of the one subframe.

6. The method according to claim 5, wherein before, for the one subframe, transmitting, by the processor of the network-side device, the data to the UE using the one subframe as the downlink subframe when the one subframe is determined as the downlink subframe in accordance with the first configuration information and the one subframe is determined as the downlink subframe in accordance with the second configuration information, the method further comprises:
configuring, by the processor of the network-side device, the UE to receive the data using the one subframe as the downlink subframe;
before, for the one subframe, transmitting, by the processor of the network-side device to the UE using the one subframe as the special subframe when the one subframe is determined as the special subframe in accordance with the first configuration information and the one subframe is determined as the downlink subframe in accordance with the second configuration information, the method further comprises:
receive the data using the one subframe as the downlink subframe when the one subframe is determined as a downlink subframe in accordance with the first configuration information and the one subframe is determined as the downlink subframe in accordance with the second configuration information; or,
receive the data using the one subframe as the special subframe when the one subframe is determined as a special subframe in accordance with the first configuration information and the one subframe is determined as a downlink subframe in accordance with the second configuration information; or, receive the data using the one subframe as the special subframe when the one subframe is determined as a special subframe in accordance with the first configuration information and the one subframe is determined as the special subframe in accordance with the second configuration information; or, receive the data using the one subframe as the downlink subframe and the special subframe when the one subframe is determined as a downlink subframe in accordance with the first configuration information and the one subframe is determined as a special subframe in accordance with the second configuration information;

wherein the processor is configured to receive the data via all symboles in a first resource of the subframe and a downlink symbol in a special subframe format in a second resource of the subframe.

7. The method according to claim 6, further comprising:
configuring, by the processor of the network-side device, the UE to receive the data in accordance with uplink/downlink subframe configuration, thereby to enable the UE to receive the data in accordance with the second configuration information; or, configuring, by the processor of the network-side device, the UE to receive the data in accordance with dynamic subframe configuration, thereby to enable the UE to receive the data in accordance with the first configuration information.

8. The method according to claim 5, wherein the first configuration information comprises information of conversion of the downlink subframe configured in the second configuration information into the special subframe and/or information of conversion of the special subframe configured in the second configuration information into the downlink subframe.

9. A User Equipment (UE) for receiving data, comprising: a processor configured to,
determine first configuration information for a dynamic subframe and second configuration information in system information; and receive data in accordance with the first configuration information and the second configuration information;

wherein for one subframe, the processor is configured to:
after the UE is configured by the network-side device to receive the data using the subframe as the special subframe, for the one subframe, receive the data using the one subframe as the special subframe when the one subframe is determined as the special subframe in accordance with the first configuration information and the one subframe is determined as the special subframe in accordance with the second configuration information; or, after the UE is determined by the network-side device to receive the data using the subframe as the downlink subframe and the special subframe, for the one subframe, receive the data using the one subframe as the downlink subframe and the special subframe when the one subframe is determined as the downlink subframe in accordance with the first configuration information and the one subframe is determined as the special subframe in accordance with the second configuration information.

10. The UE according to claim 9, wherein the processor is further configured to:
after the UE is configured by the network-side device to receive the data using the subframe as the downlink subframe, for the one subframe, receive the data using the one subframe as the downlink subframe when the one subframe is determined as the downlink subframe in accordance with the first configuration information and the one subframe is determined as the downlink subframe in accordance with the second configuration information; or, configuring, by the processor of the network-side device, the UE to receive the data using the one subframe as the special subframe; and before, for the one subframe, transmitting, by the processor of the network-side device, the data to the UE using the one subframe as the special subframe when the one subframe is determined as the special subframe in accordance with the first configuration information and the one subframe is determined as the special subframe in accordance with the second configuration information, the method further comprises: configuring, by the processor of the network-side device, the UE to receive the data using the one subframe as the downlink subframe and the special subframe.

11. The UE according to claim 10, wherein the processor is further configured to:
after the UE is configured by the network-side device to receive the data in accordance with uplink/downlink subframe configuration, receive the data in accordance with the second configuration information; or, after the UE is configured by the network-side device to receive the data in accordance with dynamic subframe configuration, receive the data in accordance with the first configuration information.

12. The UE according to claim 9, wherein the first configuration information comprises information of conversion of the downlink subframe configured in the second configuration information into the special subframe and/or information of conversion of the special subframe configured in the second configuration information into the downlink subframe.

13. A network-side device for transmitting data, comprising: a processor configured to,
determine first configuration information for a dynamic subframe corresponding to a User Equipment (UE) and second configuration information in system information corresponding to the UE; and transmit data to the UE in accordance with the first configuration information and the second configuration information;

wherein for one subframe, the processor is configured to:
transmit the data to the UE using the subframe as the downlink subframe when the subframe is determined as a downlink subframe in accordance with the first configuration information and the subframe is determined as the downlink subframe in accordance with the second configuration information; or, transmit the data to the UE using the subframe as the special subframe when the subframe is determined as a special subframe in accordance with the first configuration information and the subframe is determined as a downlink subframe in accordance with the second configuration information; or, transmit the data to the UE using the subframe as the special subframe when the subframe is determined as a special subframe in accordance with the first configuration information and the subframe is determined as the special subframe in accordance with the second configuration information; or, transmit the data to the UE using the subframe as the downlink subframe and the special subframe when the subframe is determined as a downlink subframe in accordance with the first configuration information and the subframe is determined as a special subframe in accordance with the second configuration information;

wherein the processor is configured to transmit the data to the UE via all symboles in a first resource of the subframe and a downlink symbol in a special subframe format in a second resource of the subframe.

14. The network-side device according to claim 13, wherein the processor is configured to:

after the UE is configured to receive the data using the subframe as the downlink subframe, for the one subframe, transmit the data to the UE using the one subframe as the downlink subframe when the one subframe is determined as the downlink subframe in accordance with the first configuration information and the one subframe is determined as the downlink subframe in accordance with the second configuration information; or, after the UE is configured to receive the data using the subframe as the special subframe, for the one subframe, transmit the data to the UE using the one subframe as the special subframe when the one subframe is determined as the special subframe in accordance with the first configuration information and the one subframe is determined as the downlink subframe in accordance with the second configuration information; or, after the UE is configured to receive the data using the subframe as the special subframe, for the one subframe, transmit the data to the UE using the one subframe as the special subframe when the one subframe is determined as the special subframe in accordance with the first configuration information and the one subframe is determined as the special subframe in accordance with the second configuration information; or, after the UE is configured to receive the data using the subframe as the downlink subframe and the special subframe, for the one subframe, transmit the data to the UE using the one subframe as the downlink subframe and the special subframe when the one subframe is determined as the downlink subframe in accordance with the first configuration information and the subframe is determined as the special subframe in accordance with the second configuration information.

15. The network-side device according to claim 14, wherein the processor is further configured to:

configure the UE to receive the data in accordance with the uplink/downlink subframe configuration, thereby to enable the UE to receive the data in accordance with the second configuration information; or, configure the UE to receive the data in accordance with the dynamic subframe configuration, thereby to enable the UE to receive the data in accordance with the first configuration information.

16. The network-side device according to claim 13, wherein the first configuration information includes information of conversion of the downlink subframe configured in the second configuration information into the special subframe and/or information of conversion of the special subframe configured in the second configuration information into the downlink subframe.

* * * * *